(12) United States Patent
Chang

(10) Patent No.: US 10,599,272 B2
(45) Date of Patent: Mar. 24, 2020

(54) PORTABLE ELECTRONIC DEVICE AND ACTIVE CAPACITIVE STYLUS THEREOF

(71) Applicant: WALTOP INTERNATIONAL CORPORATION, Hsinchu (TW)

(72) Inventor: Yi-Chih Chang, Hsinchu (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 68 days.

(21) Appl. No.: 15/633,194

(22) Filed: Jun. 26, 2017

(65) Prior Publication Data
US 2018/0260048 A1 Sep. 13, 2018

(30) Foreign Application Priority Data
Mar. 8, 2017 (TW) .............................. 106107572 A

(51) Int. Cl.
G06F 3/044 (2006.01)
G06F 3/041 (2006.01)
G06F 3/0354 (2013.01)
G06F 3/038 (2013.01)

(52) U.S. Cl.
CPC ............ G06F 3/044 (2013.01); G06F 3/0383 (2013.01); G06F 3/03545 (2013.01); G06F 3/0414 (2013.01); G06F 3/0416 (2013.01)

(58) Field of Classification Search
None
See application file for complete search history.

(56) References Cited

U.S. PATENT DOCUMENTS

| | | | |
|---|---|---|---|
| 2015/0084934 A1* | 3/2015 | Ho | G06F 3/03545 345/179 |
| 2015/0091844 A1* | 4/2015 | Ho | G06F 3/044 345/174 |
| 2015/0212605 A1* | 7/2015 | Lien | G06F 3/03545 345/179 |
| 2016/0357276 A1* | 12/2016 | Chang | G06F 3/03545 |
| 2017/0102792 A1* | 4/2017 | Aoki | G06F 3/044 |

* cited by examiner

*Primary Examiner* — Ifedayo B Iluyomade
(74) *Attorney, Agent, or Firm* — Li & Cai Intellectual Property (USA) Office

(57) ABSTRACT

The present disclosure provides a portable electronic device and an active capacitive stylus thereof. The active capacitive stylus includes a pen-shaped casing structure, a support structure, a circuit substrate, a sensor module, an elastic assembly, an abutting assembly, a pen head structure and a power supply component. The circuit substrate is positioned on the support structure. The sensor module is electrically connected to the circuit substrate. The elastic assembly includes a flexible holder contacting the sensor module and a flexible element disposed between the flexible holder and the sensor module. The abutting assembly is disposed inside the pen-shaped casing structure to abut against the flexible holder. The pen head structure, the abutting assembly, the elastic assembly and the sensor module are abutted one to another, so that there is no gap between two of the pen head structure, the abutting assembly, the elastic assembly and the sensor module.

10 Claims, 8 Drawing Sheets

US 10,599,272 B2

PORTABLE ELECTRONIC DEVICE AND ACTIVE CAPACITIVE STYLUS THEREOF

FIELD OF THE INVENTION

The present disclosure relates to an electronic device and a stylus thereof, and more particularly to a portable electronic device and an active capacitive stylus thereof.

BACKGROUND OF THE INVENTION

Conventional touch control devices may be classified into three types: resistive, electromagnetic and capacitive. Operation with a resistive touch control device requires a rigid pen tip to apply a significant force on the resistive touch control device in a very small area to accomplish deformation of the resistive touch sensor; an electromagnetic touch control device requires a special battery powered pen for input; and a capacitive touch control device relies on capacitive coupling, which takes place as soon as the capacitive touch sensor is touched by a conductive object so that the touch position can then be identified according to the variation in capacitance at the touch point. Therefore, a capacitive touch control device does not require an input pen that consumes electricity, nor is it necessary to subject a capacitive touch sensor to concentrated pressure application for deformation, and thus a capacitive touch control device has a longer service life. Furthermore, mass production of capacitive touch control devices requires lower costs due to its simple construction, less components, and has a higher yield rate.

A capacitive touch control device can be operated in many ways, the most common way being usage of a conductor such as a finger or a pen to touch or slide on the surface of the capacitive touch control device, so that the capacitive touch sensor thereof generates a response signal. However, as capacitive touch control devices find more and more applications, lower precision in positional detection tends to hinder the smoothness of operations where more precise and more efficient detection is required, such as those on hand-held devices. In order to enable enhanced precision in positional detection, many people choose to use pens for capacitive touch input.

SUMMARY OF THE INVENTION

One aspect of the present disclosure relates to a portable electronic device and an active capacitive stylus thereof.

One of the embodiments of the present disclosure provides an active capacitive stylus, including a pen-shaped casing structure, a support structure, a circuit substrate, a sensor module, an elastic assembly, an abutting assembly, a pen head structure and a power supply component. The support structure is disposed inside the pen-shaped casing structure. The circuit substrate is positioned on the support structure and disposed inside the pen-shaped casing structure. The sensor module is disposed inside the pen-shaped casing structure and electrically connected to the circuit substrate. The elastic assembly is disposed inside the pen-shaped casing structure to contact the sensor module. The elastic assembly includes a flexible holder contacting the sensor module and a flexible element disposed between the flexible holder and the sensor module. The abutting assembly is disposed inside the pen-shaped casing structure to abut against the flexible holder. The pen head structure has a first portion disposed inside the pen-shaped casing structure to abut against the abutting assembly, and a second portion disposed out of the pen-shaped casing structure. The power supply component is disposed inside the pen-shaped casing structure and electrically connected to the circuit substrate. The pen head structure, the abutting assembly, the elastic assembly and the sensor module are abutted one to another, so that there is no gap between any two of the pen head structure, the abutting assembly, the elastic assembly and the sensor module.

Another one of the embodiments of the present disclosure provides a portable electronic device using an active capacitive stylus, in which the active capacitive stylus includes a pen-shaped casing structure, a support structure, a circuit substrate, a sensor module, an elastic assembly, an abutting assembly, a pen head structure and a power supply component.

Therefore, there is no gap between any two of the pen head structure, the abutting assembly, the elastic assembly and the sensor module by virtue of the features of "the elastic assembly including a flexible holder contacting the sensor module and a flexible element disposed between the flexible holder and the sensor module" and "the pen head structure, the abutting assembly, the elastic assembly and the sensor module being abutted one to another".

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Figure 1:
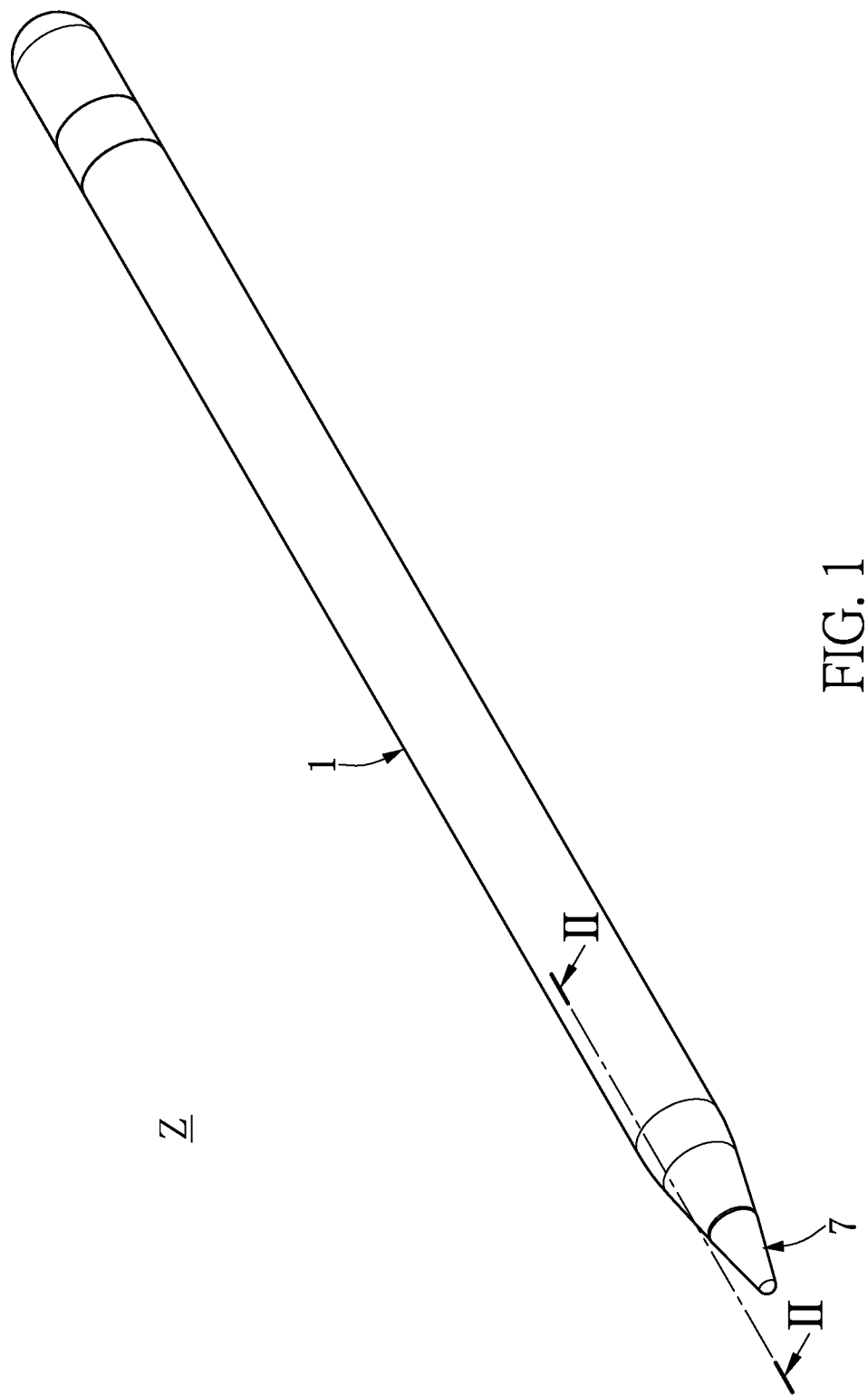
FIG. 1 shows an assembled schematic view of the active capacitive stylus according to the present disclosure.

Embodiments of a portable electronic device and an active capacitive stylus thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Referring to FIG. 1 to FIG. 8, the present disclosure provides an active capacitive stylus (or stylus pen, touch pen), including a pen-shaped casing structure 1, a support structure 2, a circuit substrate 3, a sensor module 4, an elastic assembly 5, an abutting assembly 6, a pen head structure 7 and a power supply component 8.

Figure 3:
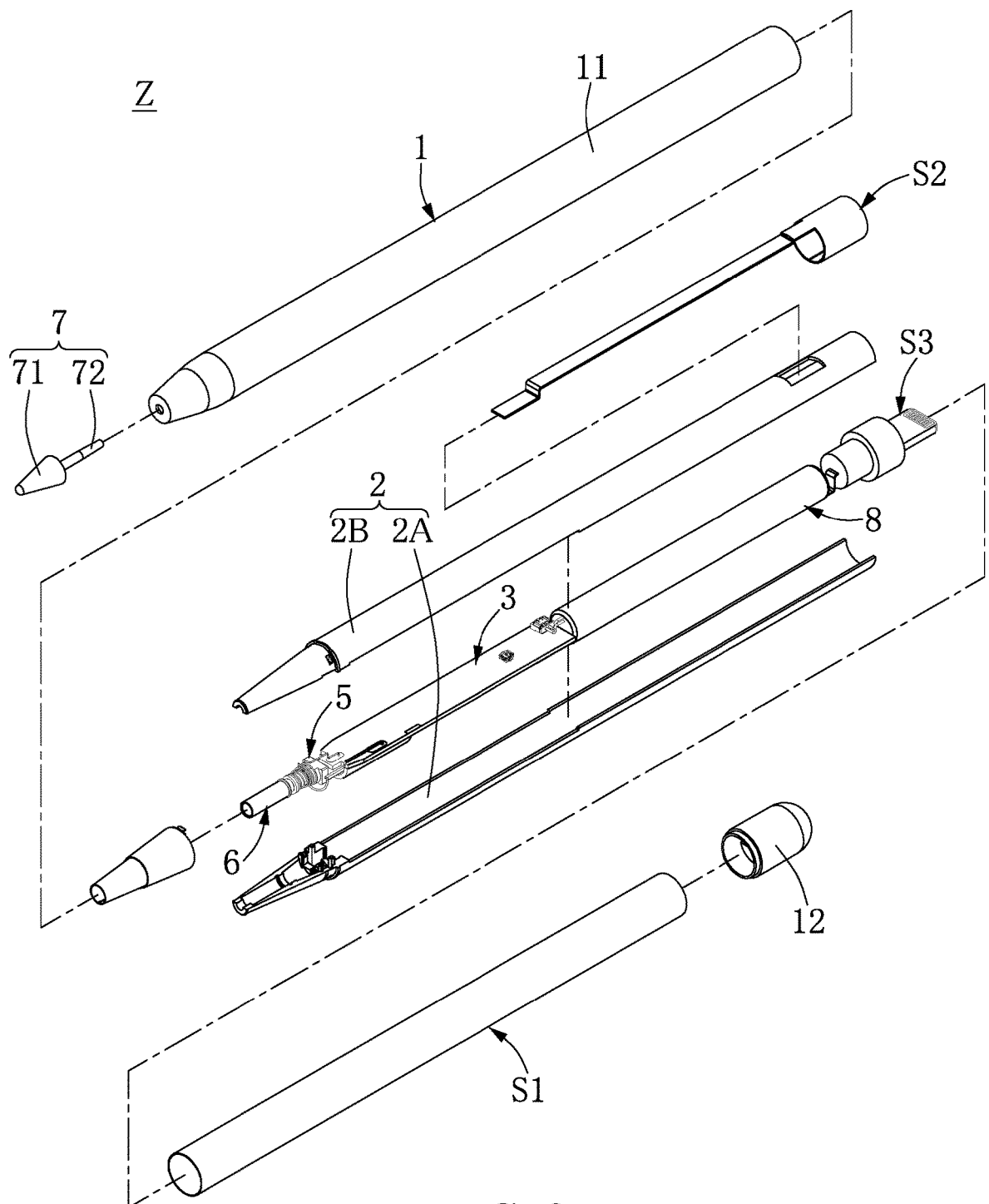
FIG. 3 shows an exploded schematic view of the active capacitive stylus according to the present disclosure.
Figure 4:
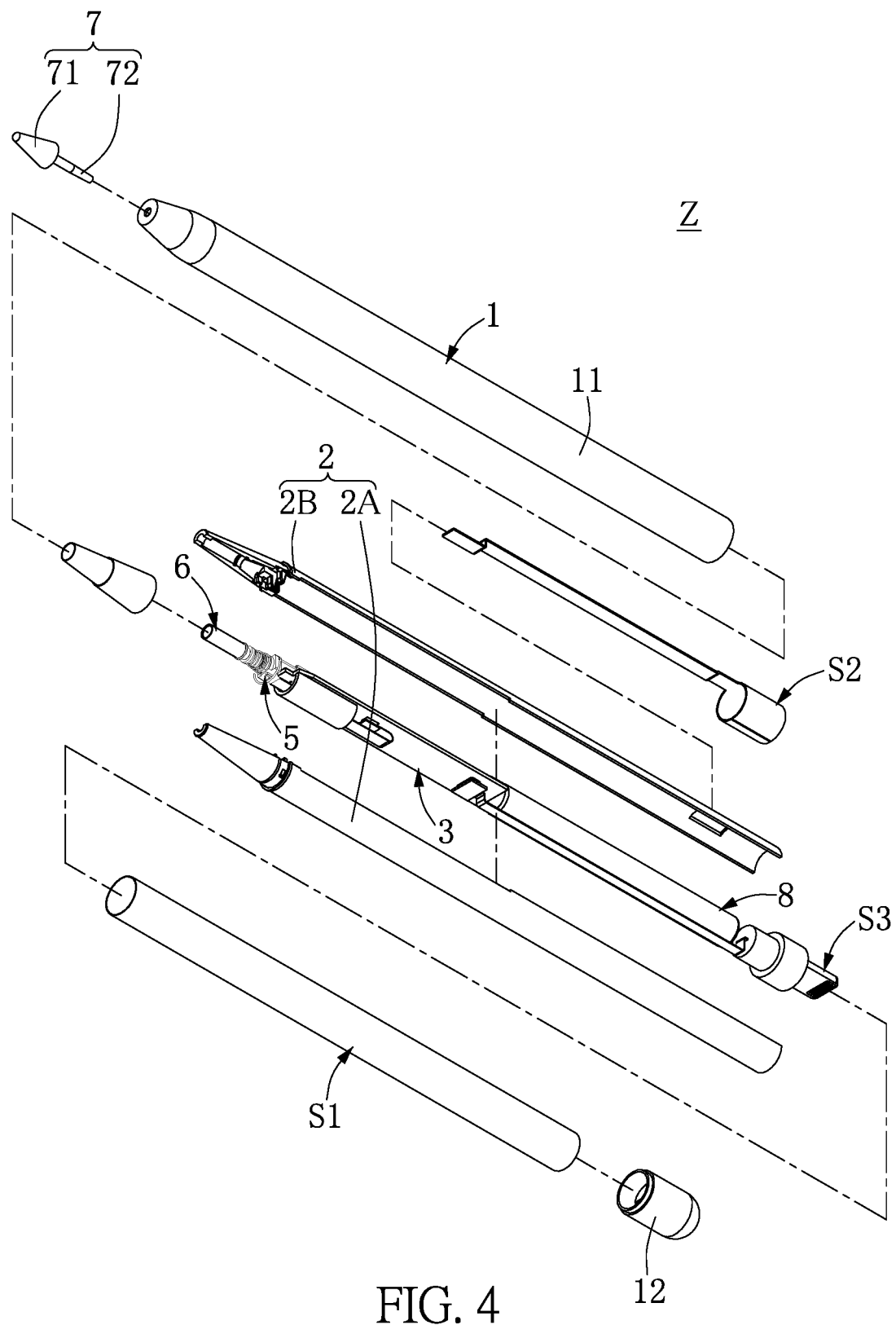
FIG. 4 shows another exploded schematic view of the active capacitive stylus according to the present disclosure.

Firstly, referring to FIG. 1 and FIG. 3, the pen-shaped casing structure at least includes a pen body 11 and a pen cap 12. For example, the pen body 11 may have a circular pen-shaped structure (as shown in FIG. 1) or a square pen-shaped structure according to different requirements, but the shape of the pen body 11 as shown in FIG. 1 is merely an example and is not meant to limit the scope of the present disclosure.

Moreover, referring to FIG. 1 and FIG. 3, the support structure 2 is disposed inside the pen-shaped casing structure 1, and the circuit substrate 3 is positioned on the support structure 2 and disposed inside the pen-shaped casing structure 1. More particularly, the support structure 2 may be composed of a first support body 2A (otherwise known as a bottom lateral holder) and a second support body 2B (otherwise known as a top lateral holder). It should be noted that when the first support body 2A and the second support body 2B can be mated with each other to form the support structure 2, both the shielding element S1 and the antenna element S2 can be disposed around the support structure 2, and the antenna element S2 can partially pass through the second support body 2B to then be disposed inside the support structure 2 and electrically connected to the circuit substrate 3.

Figure 2:
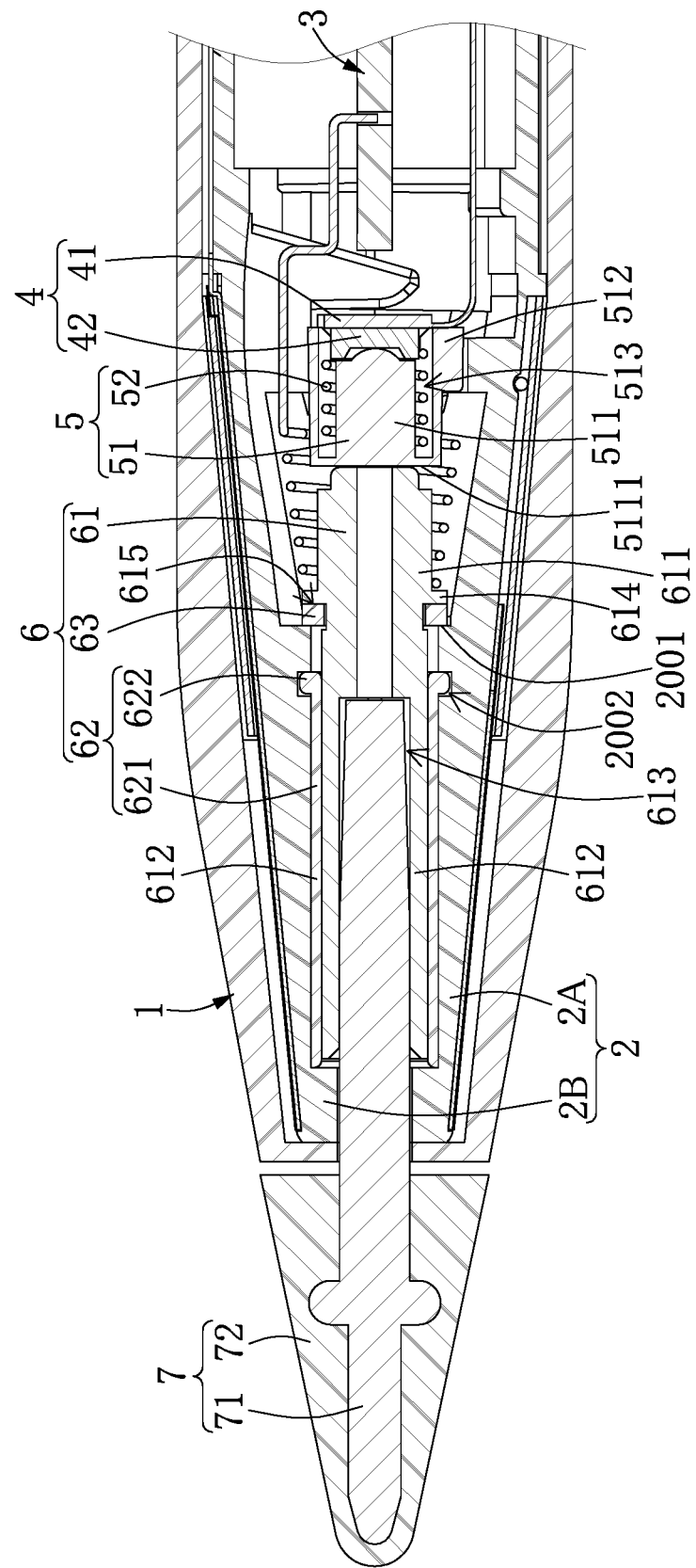
FIG. 2 shows a cross-sectional schematic view taken along the section line II-II of FIG. 1.
Figure 5:
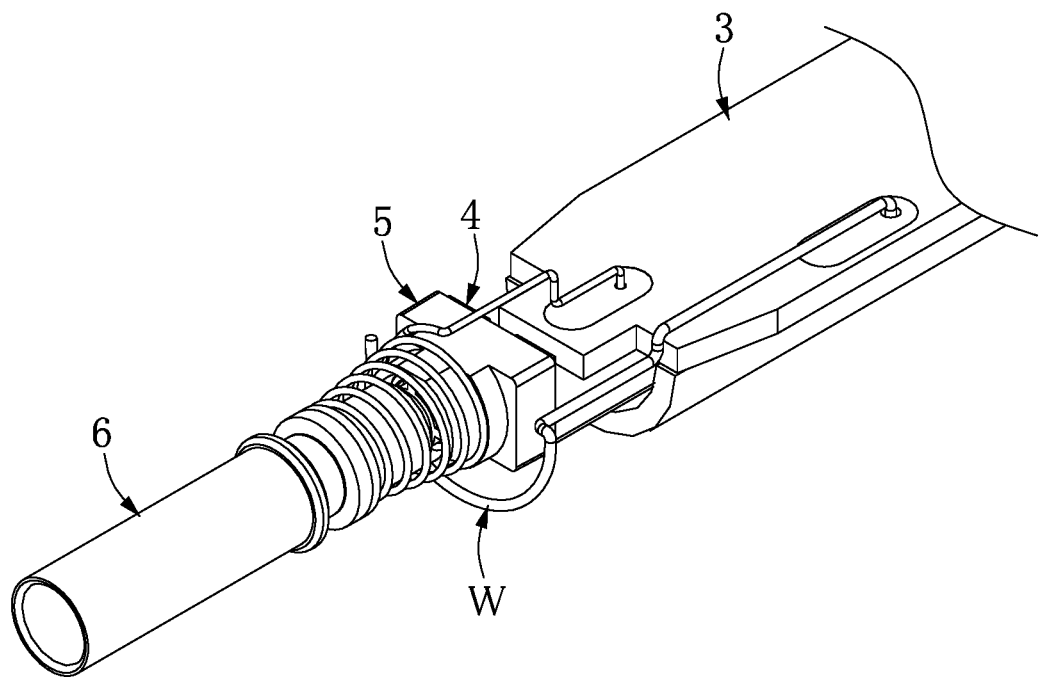
FIG. 5 shows an assembled schematic view of the sensor module, the elastic assembly and the abutting assembly of the active capacitive stylus according to the present disclosure.
Figure 6:
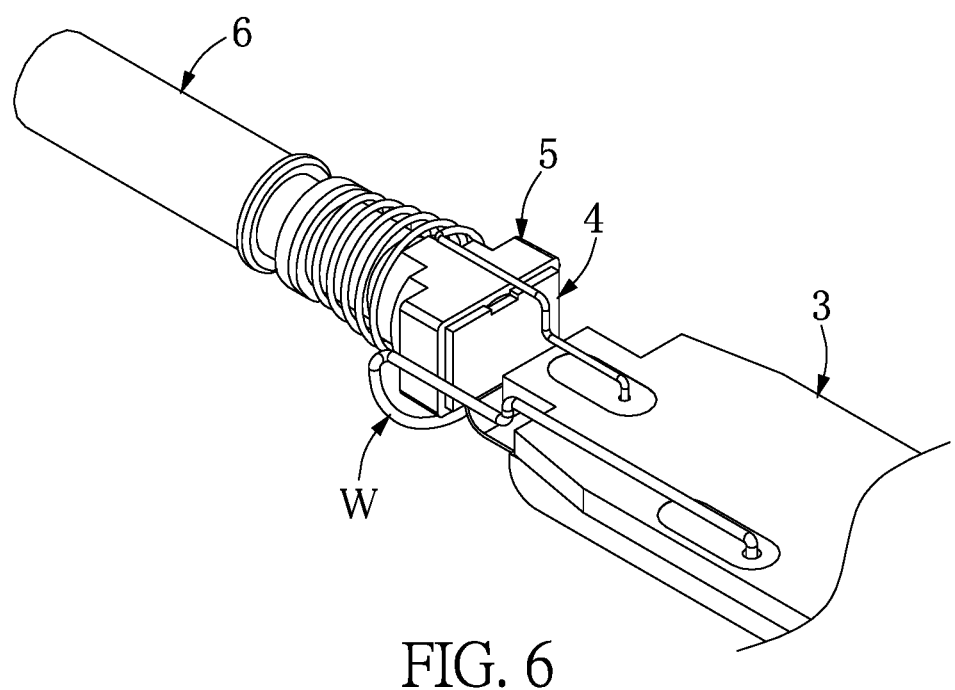
FIG. 6 shows another assembled schematic view of the sensor module, the elastic assembly and the abutting assembly of the active capacitive stylus according to the present disclosure.
Figure 7:
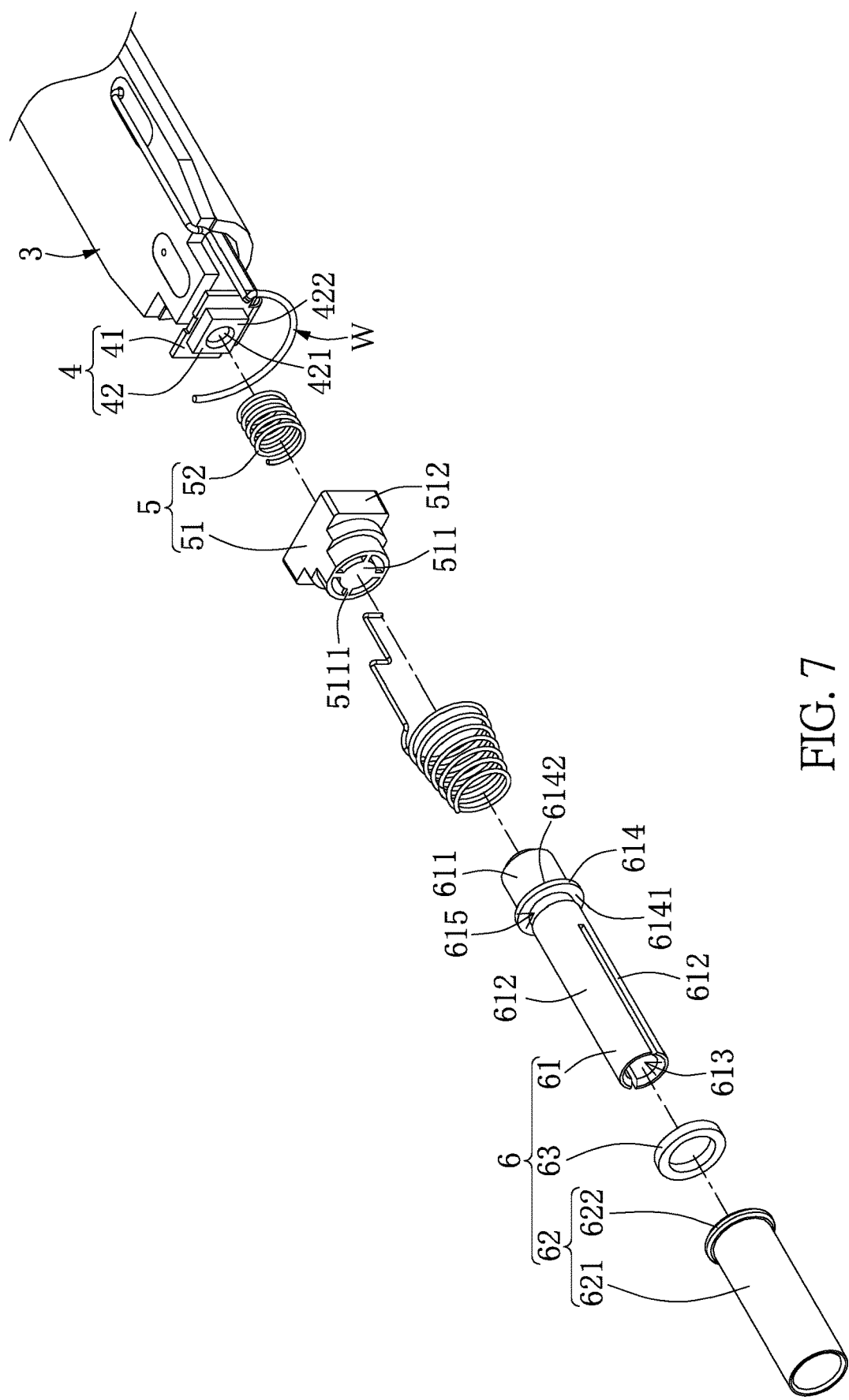
FIG. 7 shows an exploded schematic view of the sensor module, the elastic assembly and the abutting assembly of the active capacitive stylus according to the present disclosure.
Figure 8:
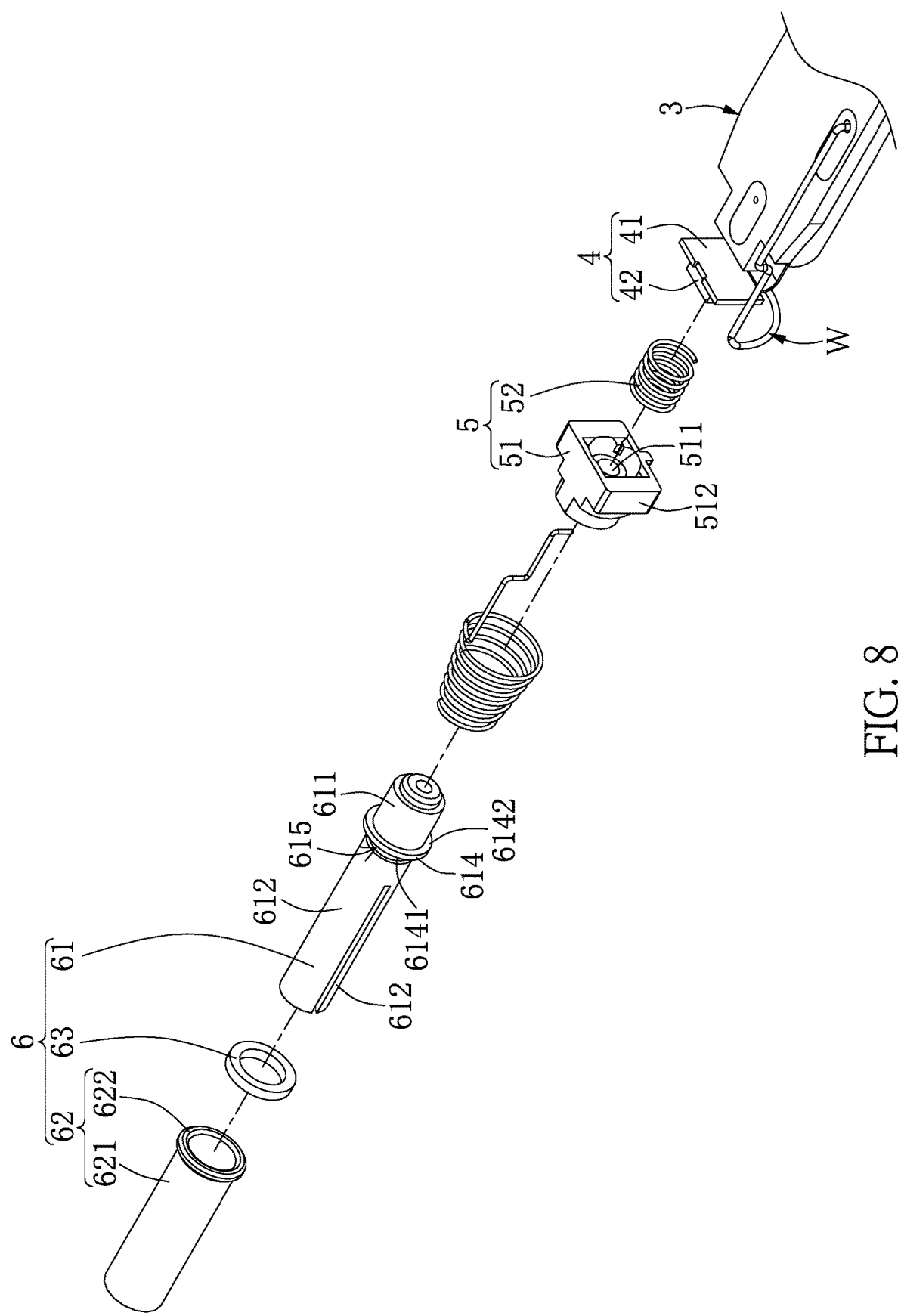
FIG. 8 shows another exploded schematic view of the sensor module, the elastic assembly and the abutting assembly of the active capacitive stylus according to the present disclosure.

Furthermore, referring to FIG. 2, FIG. 5 and FIG. 7, the sensor module 4 is disposed inside the pen-shaped casing structure 1 and electrically connected to the circuit substrate 3, and the elastic assembly 5 is disposed inside the pen-shaped casing structure 1 to contact the sensor module 4. More particularly, the sensor module 4 includes a carrier substrate 41 and a force sensor 42. The carrier substrate 41 is electrically connected to the circuit substrate 3, and the force sensor 42 is disposed on the carrier substrate 41 and electrically connected to the carrier substrate 41. In addition, the elastic assembly 5 includes a flexible holder 51 contacting the sensor module 4 and a flexible element 52 disposed between the flexible holder 51 and the sensor module 4, and the flexible holder 51 has a contacting portion 511, a surrounding portion 512 and a surrounding space 513.

According to the above description, the contacting portion 511 can be used to contact a sensing area 421 of the force sensor 42. The surrounding portion 512 can be surroundingly connected to the contacting portion 511 and abutted against the carrier substrate 41 through a plurality of connecting ribs 5111. The surrounding space 513 is surroundingly formed between the contacting portion 511 and the surrounding portion 512. In addition, the flexible element 52 can be disposed around the surrounding portion 512 and received inside the surrounding space 513, and the flexible element 52 has an end portion abutting against a non-sensing area 422 of the force sensor 42 or the carrier substrate 41. For example, the end portion of the flexible element 52 is abutted against the non-sensing area 422 of the force sensor 42 as shown in FIG. 2, but this configuration is merely an example and is not meant to limit the scope of the present disclosure.

In addition, referring to FIG. 2, FIG. 5 and FIG. 7, the abutting assembly 6 is disposed inside the pen-shaped casing structure 1 to abut against the flexible holder 51. More particularly, the abutting assembly 6 includes a pen core holder 61 abutting against the flexible holder 51, a position limiting sleeve 62 disposed around the pen core holder 61 and positioned by the support structure 2, and an elastic ring 63 disposed around the pen core holder 61 and abutted against the support structure 2. Moreover, the pen core holder 61 has a surrounding convex body 614 and a surrounding concave groove 615 that are disposed on an outer surface thereof, and the elastic ring 63 is disposed inside the surrounding concave groove 615 and abutted between a first surrounding lateral surface 6141 and an inner surface 2001 of the support structure 2. For example, the elastic ring 63 may be an O-ring or any type of flexible ring.

According to the above description, the pen core holder 61 has a main body 611 abutting the flexible holder 51, at least two extending portions 612 separated from each other and extending outwardly from the main body 611, and a receiving space 613 formed between at least two extending portions 612 for partially receiving a pen core (or a pen lead) of the pen head structure 7. In addition, the position limiting sleeve 62 has a sleeve portion 621 and a position limiting portion 622. The sleeve portion 621 is disposed around the at least two extending portions 612 and abutted between the pen core holder 61 and the support structure 2, and the position limiting portion 622 is surroundingly disposed on the sleeve portion 621 and positioned inside an inner surrounding groove 2002 of the support structure 2.

Moreover, referring to FIG. 1 to FIG. 3, the pen head structure 7 has a first portion disposed inside the pen-shaped casing structure 1 to abut against the abutting assembly 6, and a second portion disposed out of the pen-shaped casing structure 1. More particularly, the pen head structure 7 has a pen core 71 and a pen core cap 72. The pen core cap 72 has an embedded portion received inside the receiving space 613 of the pen core holder 61 and an exposed portion enclosed by the pen core cap 72. In addition, the power supply component 8 is disposed inside the pen-shaped casing structure 1 and electrically connected to the circuit substrate 3, and a charger module S3 is disposed between the pen body 11 and the pen cap 12 and electrically connected to the circuit substrate 3. For example, the power supply component 8 may be an electrical storage component such as a rechargeable battery.

Therefore, the pen head structure 7, the abutting assembly 6, the elastic assembly 5 and the sensor module 4 are abutted one to another without gaps between any two of the pen head structure 7, the abutting assembly 6, the elastic assembly 5 and the sensor module 4. That is to say, the pen head structure 7 and the abutting assembly 6 are abutted against each other, so that there is no gap between the pen head structure 7 and the abutting assembly 6. The abutting assembly 6 and the elastic assembly 5 are abutted against each other, so that there is no gap between the abutting assembly 6 and the elastic assembly 5. The elastic assembly 5 and the sensor module 4 are abutted against each other, so that there is no gap between the elastic assembly 5 and the sensor module 4. Hence, the pen head structure 7, the abutting assembly 6, the elastic assembly 5 and the sensor module 4 are abutted one to another without gaps along an axial direction, so that the active capacitive stylus Z can provide a smooth writing sensation without gaps along the axial direction.

It should be noted that the sleeve portion 621 is disposed around the at least two extending portions 612 and abutted between the pen core holder 61 and the support structure 2, and the position limiting portion 622 is surroundingly disposed on the sleeve portion 621 and positioned inside the inner surrounding groove 2002 of the support structure 2, so that the pen head structure 7, the abutting assembly 6 and the support structure 2 are abutted one to another without gaps along a radial direction such that the active capacitive stylus Z can provide a smooth writing sensation without shakiness along the radial direction.

Figure 9:
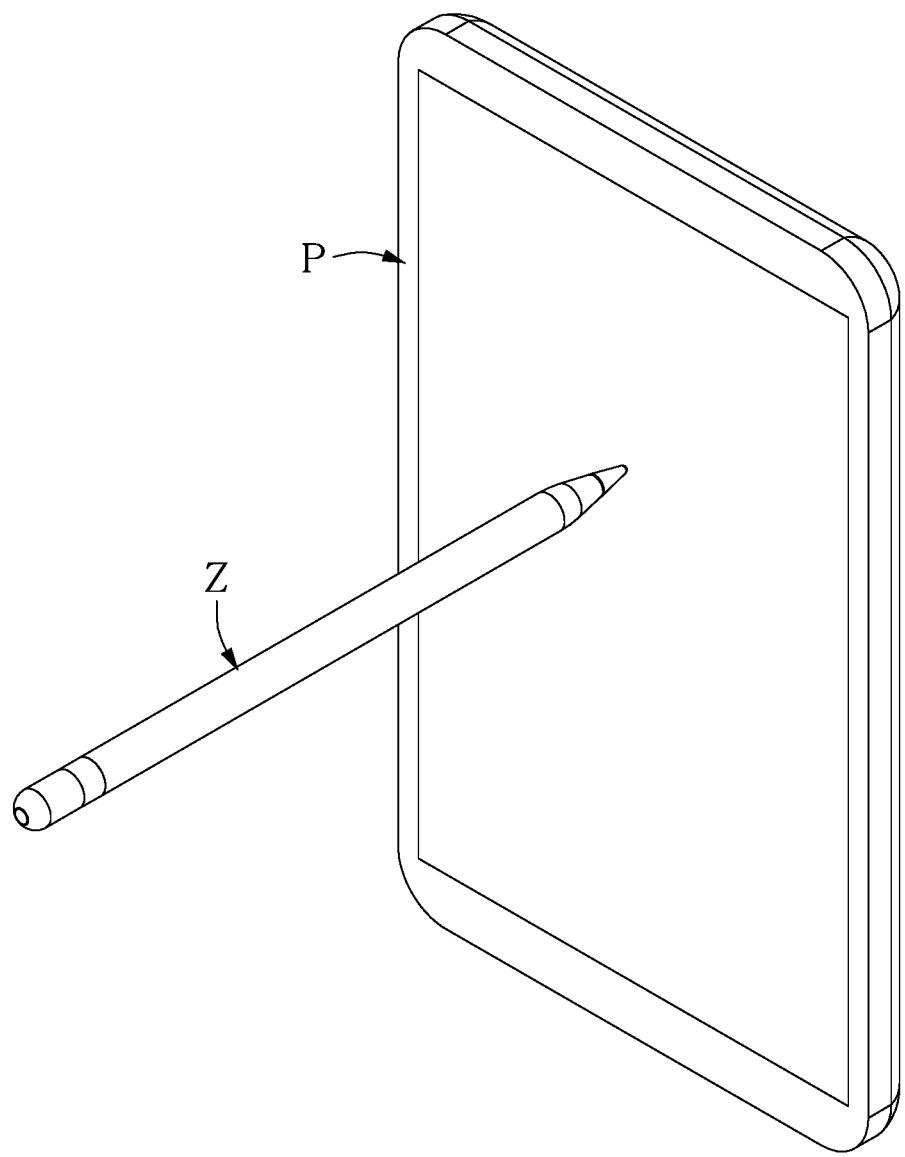
FIG. 9 shows a schematic view of the portable electronic device using an active capacitive stylus according to the present disclosure.

Referring to FIG. 9, the present disclosure further provides a portable electronic device P (such as a smart phone or a tablet computer) using an active capacitive stylus Z (as shown in FIG. 1) so as to input commands or signals. Hence, when the active capacitive stylus Z is applied to a touch panel of the portable electronic device P, a writing pressure of the active capacitive stylus Z can be determined by the sensor module 4, so that lines of different thicknesses (or different widths) can be shown on the touch panel of the portable electronic device P according to different writing pressures.

In conclusion, there is no gap between any two of the pen head structure 7, the abutting assembly 6, the elastic assembly 5 and the sensor module 4 by virtue of the features of "the elastic assembly 5 including a flexible holder 51 contacting the sensor module 4 and a flexible element 52 disposed between the flexible holder 51 and the sensor module 4" and "the pen head structure 7, the abutting assembly 6, the elastic assembly 5 and the sensor module 4 being abutted one to another". Hence, the pen head structure 7, the abutting assembly 6, the elastic assembly 5 and the sensor module 4 are abutted one to another without gaps along an axial direction, so that the active capacitive stylus Z can provide a smooth writing sensation without gaps along the axial direction.

Furthermore, the pen head structure 7, the abutting assembly 6 and the support structure 2 are abutted one to another without gaps along a radial direction, so that the active capacitive stylus Z can provide a smooth writing sensation without shakiness along the radial direction.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. An active capacitive stylus, comprising:
    a pen-shaped casing structure;
    a support structure disposed inside the pen-shaped casing structure;
    a circuit substrate positioned on the support structure and disposed inside the pen-shaped casing structure;
    a sensor module disposed inside the pen-shaped casing structure and electrically connected to the circuit substrate;
    an elastic assembly disposed inside the pen-shaped casing structure to contact the sensor module, wherein the elastic assembly includes a flexible holder directly contacting the sensor module and a flexible element disposed between the flexible holder and the sensor module;
    an abutting assembly disposed inside the pen-shaped casing structure to abut against the flexible holder, and including:
        a pen core holder abutting against the flexible holder;
        a position limiting sleeve disposed around the pen core holder and positioned by the support structure, and includes a position limiting portion positioned inside an inner surrounding groove of the support structure so as to prevent the position limiting portion from being moved in the inner surrounding groove; and
        an elastic ring disposed around the pen core holder and abutted against the support structure;
    a pen head structure having a first portion disposed inside the pen-shaped casing structure to abut against the abutting assembly and a second portion disposed out of the pen-shaped casing structure; and
    a power supply component disposed inside the pen-shaped casing structure and electrically connected to the circuit substrate;
    wherein the pen head structure, the abutting assembly, the elastic assembly and the sensor module are abutted one to another without gaps between any two of the pen head structure, the abutting assembly, the elastic assembly and the sensor module.

2. The active capacitive stylus of claim 1, wherein the sensor module includes a carrier substrate and a force sensor, the carrier substrate is electrically connected to the circuit substrate, and the force sensor is disposed on the carrier substrate and electrically connected to the carrier substrate, wherein the flexible holder has a contacting portion for contacting a sensing area of the force sensor, a surrounding portion surroundingly connected to the contacting portion and abutted against the carrier substrate, and a surrounding space surroundingly formed between the contacting portion and the surrounding portion, and wherein the flexible element is disposed around the surrounding portion and received inside the surrounding space, and the flexible element has an end portion abutting against a non-sensing area of the force sensor or the carrier substrate.

3. The active capacitive stylus of claim 1, wherein the pen core holder has a surrounding convex body and a surrounding concave groove disposed on an outer surface thereof, and the elastic ring is disposed inside the surrounding concave groove and abutted between a first surrounding lateral surface and an inner surface of the support structure.

4. The active capacitive stylus of claim 3, wherein the pen core holder has a main body abutting the flexible holder, at least two extending portions separated from each other and extending outwardly from the main body, and a receiving space formed between at least two extending portions for partially receiving a pen core of the pen head structure.

5. The active capacitive stylus of claim 4, wherein the position limiting sleeve further has a sleeve portion disposed around the at least two extending portions and abutted between the pen core holder and the support structure, and the position limiting portion is surroundingly disposed on the sleeve portion.

6. A portable electronic device using an active capacitive stylus, in which the active capacitive stylus comprises:
   a pen-shaped casing structure;
   a support structure disposed inside the pen-shaped casing structure;
   a circuit substrate positioned on the support structure and disposed inside the pen-shaped casing structure;
   a sensor module disposed inside the pen-shaped casing structure and electrically connected to the circuit substrate;
   an elastic assembly disposed inside the pen-shaped casing structure to contact the sensor module, wherein the elastic assembly includes a flexible holder directly contacting the sensor module and a flexible element disposed between the flexible holder and the sensor module;
   an abutting assembly disposed inside the pen-shaped casing structure to abut against the flexible holder, and including:
      a pen core holder abutting against the flexible holder;
      a position limiting sleeve disposed around the pen core holder and positioned by the support structure, and includes a position limiting portion positioned inside an inner surrounding groove of the support structure so as to prevent the position limiting portion from being moved in the inner surrounding groove; and
      an elastic ring disposed around the pen core holder and abutted against the support structure;
   a pen head structure having a first portion disposed inside the pen-shaped casing structure to abut against the abutting assembly and a second portion disposed out of the pen-shaped casing structure; and
   a power supply component disposed inside the pen-shaped casing structure and electrically connected to the circuit substrate;
   wherein the pen head structure, the abutting assembly, the elastic assembly and the sensor module are abutted one to another without gaps between any two of the pen head structure, the abutting assembly, the elastic assembly and the sensor module.

7. The portable electronic device of claim 6, wherein the sensor module includes a carrier substrate and a force sensor, the carrier substrate is electrically connected to the circuit substrate, and the force sensor is disposed on the carrier substrate and electrically connected to the carrier substrate, wherein the flexible holder has a contacting portion for contacting a sensing area of the force sensor, a surrounding portion surroundingly connected to the contacting portion and abutted against the carrier substrate, and a surrounding space surroundingly formed between the contacting portion and the surrounding portion, and wherein the flexible element is disposed around the surrounding portion and received inside the surrounding space, and the flexible element has an end portion abutting against a non-sensing area of the force sensor or the carrier substrate.

8. The portable electronic device of claim 6, wherein the pen core holder has a surrounding convex body and a surrounding concave groove disposed on an outer surface thereof, and the elastic ring is disposed inside the surrounding concave groove and abutted between a first surrounding lateral surface and an inner surface of the support structure.

9. The portable electronic device of claim 8, wherein the pen core holder has a main body abutting the flexible holder, at least two extending portions separated from each other and extending outwardly from the main body, and a receiving space formed between at least two extending portions for partially receiving a pen core of the pen head structure.

10. The portable electronic device of claim 9, wherein the position limiting sleeve has a sleeve portion disposed around the at least two extending portions and abutted between the pen core holder and the support structure, and the position limiting portion is surroundingly disposed on the sleeve portion.

* * * * *